United States Patent [19]

Viazzi

[11] Patent Number: 4,993,379
[45] Date of Patent: Feb. 19, 1991

[54] SLIDING STEM SEAL, PARTICULARLY FOR VALVE STEMS

[75] Inventor: Roberto Viazzi, Turin, Italy

[73] Assignee: RFT S.p.A., Turin, Italy

[21] Appl. No.: 432,140

[22] Filed: Nov. 2, 1989

[51] Int. Cl.[5] .............................................. F01L 3/00
[52] U.S. Cl. .................................. 123/188 P; 277/9.5; 123/188 R
[58] Field of Search .......................... 123/188 P, 188 R; 277/9.5

[56] References Cited

U.S. PATENT DOCUMENTS 4,531,483  7/1985  Vossieck et al. ................ 123/188 P

FOREIGN PATENT DOCUMENTS 96316  7/1980  Japan ................................. 123/188 P
1421008  1/1976  United Kingdom .

Primary Examiner—E. Rollins Cross
Attorney, Agent, or Firm—Michael N. Meller

[57] ABSTRACT

A seal for the stem of an internal combustion engine intake or exhaust valve; which seal presents a first portion mounted integral with an element supporting the stem; and a second portion inside which are formed two annular lips cooperating in contacting manner with the stem and defining, together and with the stem, an annular chamber inside which part of the lubricating oil supplied when the engine is running is trapped when the engine is idle, thus preventing the sealing lips from drying and sticking to the valve stem.

6 Claims, 1 Drawing Sheet

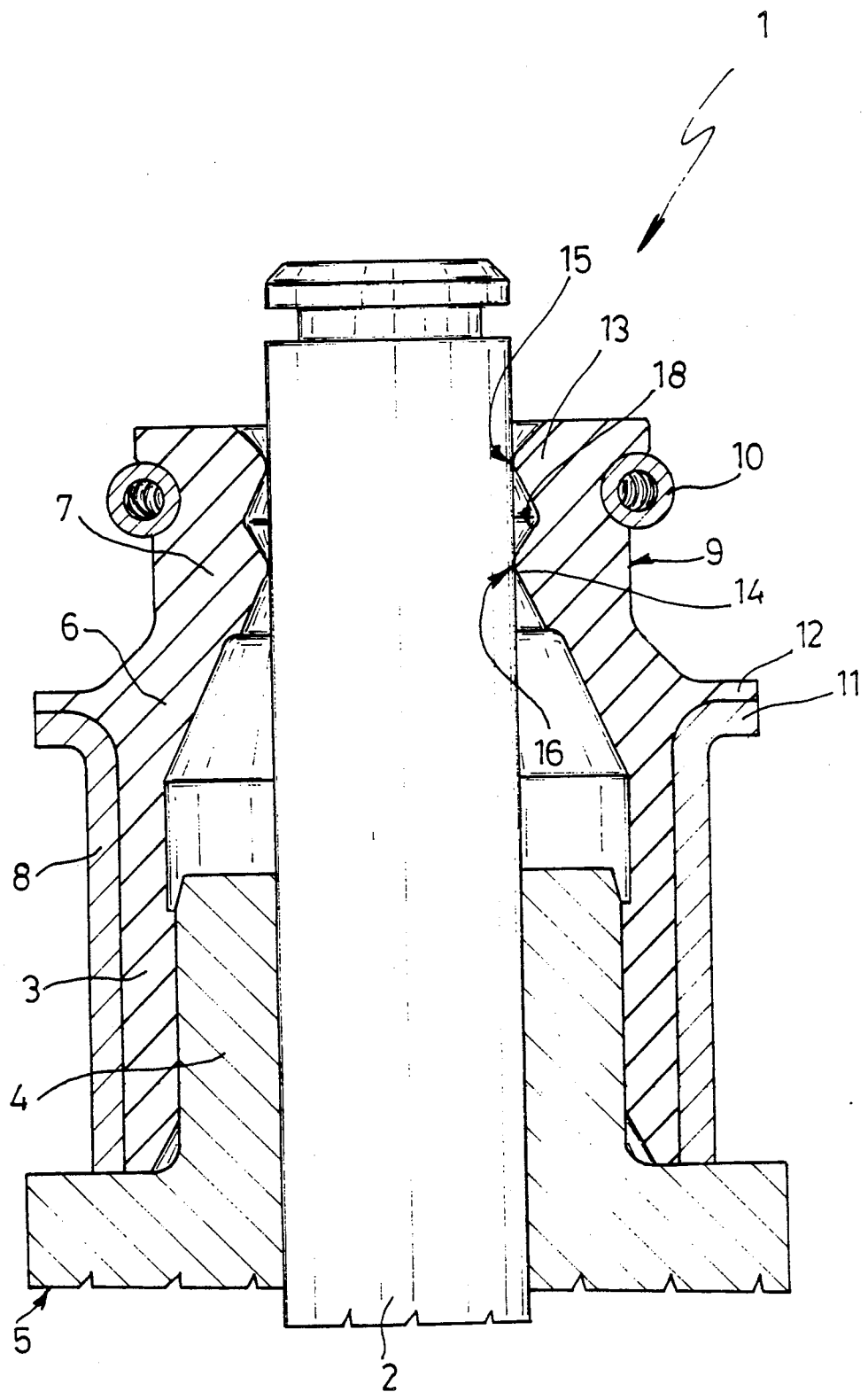

SLIDING STEM SEAL, PARTICULARLY FOR VALVE STEMS

BACKGROUND OF THE INVENTION

The present invention relates to a sliding stem seal, particularly for the stem of an internal combustion engine intake or exhaust valve.

Seals of the aforementioned type are employed for preventing the tappet lubricating oil from seeping along the valve stem into the engine, and comprise a first cylindrical portion fitted onto a cylindrical portion of a bush supporting the stem and fitted inside the cylinder head; and a second cylindrical portion inside which is formed an annular lip cooperating with the valve stem. The tappet lubricating oil also lubricates the contact surface between the valve stem and sealing lip for reducing friction between the same.

When the engine is left idle for some time, the lubricating oil seeps out of the cylinder head, thus resulting in the sealing lip drying up and sticking to the valve stem when the engine is started again, the disadvantages of which are obvious.

SUMMARY OF THE INVENTION

The aim of the present invention is to provide a seal designed to overcome the aforementioned drawback, i.e. to prevent the sealing lip from sticking to the valve stem when the engine is left idle for prolonged periods of time.

With this aim in view, according to the present invention, there is provided a sliding stem seal, particularly for the stem of an internal combustion engine valve, comprising a first portion fitted integral with an element supporting the stem; and a second portion inside which are formed top and bottom annular lips cooperating in contacting manner with the stem and defining, together with the stem, a fluidtight annular idle and to permanently keep the oil inside the chamber when the stem is not moving relative to the lips to permanently trap lubricating oil when said stem is idle.

BRIEF DESCRIPTION OF THE DRAWING

A preferred embodiment of the present invention will be described by way of a non-limiting example with reference to the accompanying drawing, in which number 1 indicates a seal for a sliding stem 2, in the example shown, the stem of a known type of internal combustion engine intake or exhaust valve (not shown).

DETAILED DESCRIPTION OF THE INVENTION

The seal 1 is substantially formed from elastomeric material, and comprises a bottom portion 3 in the form of a cylindrical sleeve designed to fit onto a cylindrical portion 4 of a bush 5 supporting stem 2; a center portion 6 substantially in the form of a truncated-cone sleeve; and a top portion 7 in the form of a cylindrical sleeve having a smaller outside diameter than portion 3. The portion 3 is encircled by an integral outer strengthening sleeve 8, made preferably of metal, having a top edge 11 in the form of an annular flange covered by a peripheral annular appendix 12 projecting radially from center portion 6. Sleeve 8 is conveniently bonded onto portions 3 and 6 at the curing stage, and bush 5, which is of known type and shown only partially, is fitted into the cylinder head on the engine.

Inside top portion 7 of seal 1, there are formed radially-projecting top and bottom annular lips 13 and 14 respectively designed to cooperate in sliding manner with stem 2, which extends through and slides axially inside seal 1 by virtue of a known hydraulic tappet (not shown). Between lips 13 and 14, and closer to lip 13, there is fitted, on outer lateral surface 9 of portion 7, an annular spring 10, the function of which is to exert predetermined pressure radially inward on lips 13 and 14 and so press them against the outer lateral surface of stem 2. Lips 13 and 14 each have a triangular radial section, the rounded, radially-innermost free apex cooperating with stem 2. In particular, top lip 13 has an inner edge 15 defining a more rounded apex than that defined by the corresponding inner edge 16 of bottom lip 14, thus providing greater contact with stem 2. Moreover, lips 13 and 14 are designed to cooperate differentially with stem 2, by virtue of top lip 13 being higher than bottom lip 14 and so cooperating to a greater extent with stem 2.

In actual use, lips 13 and 14 define, together and with the outer surface of stem 2, a fluidtight annular chamber 18 designed, when stem 2 is stationary to permanently trap part of the oil usually present in the cylinder head on the engine for lubricating the tappets controlling stem 2.

When the engine is running, i.e. with stem 2 sliding axially inside seal 1, the lubricating oil outside seal 1 is allowed to seep inside chamber 18 by virtue of the softly rounded shape of edge 15 on lip 13, and despite lip 13 cooperating with stem 2. Due to the sharper edge 16 on lip 14, however, the oil entering chamber 18 is prevented from seeping out, and so gradually fills up chamber 18. When stem 2 is stationary on the other hand, the aforementioned design of lips 13 and 14 results in total sealing by both top lip 13 and bottom lip 14 on stem 2, thus preventing both upward and downward leakage. When stem 2 is stationary, therefore, the oil inside chamber 18 is trapped for ensuring that lips 13 and 14 are adequately lubricated when stem 2 is next operated.

The advantages of the present invention will be clear from the foregoing description. In particular, even when the engine is idle, sufficient lubricating oil is trapped between lips 13 and 14 for preventing these from sticking to stem 2, and for ensuring they are kept lubricated even over prolonged periods, thus enabling smooth, troublefree start-up of engine.

To those skilled in the art it will be clear that changes may be made to seal 1 as described and illustrated herein without, however, departing from the scope of the present invention.

I claim:

1. A sliding stem seal, particularly for the stem (2) of an internal combustion engine valve, comprising a first portion (3) fitted integral with an element (5) supporting said stem (2) and a second portion (7) inside which a top annular lip (13) and a bottom annular lip (14) are formed, said lips contacting a circumferential surface of said stem and defining therebetween and together with said circumferential surface of said stem a fluid-tight annular chamber (18), wherein said top lip is more rounded and higher than said bottom lip so that said lips cooperate differentially with said stem in order to admit lubricant oil past said upper lip and inside said chamber when said stem is moving relative to said lips and to trap said lubricant oil inside said chamber when said stem is not moving relative to said lips.

2. A seal as claimed in claim 1, wherein said lips each have a triangular radial section and cooperate with said stem via respective rounded edges (15, 16) defining respective free apices, said edge of said top lip being more rounded than said edge of said bottom lip.

3. A seal as claimed in claim 1, wherein on an outer surface of said second portion, spring means (10) are provided for pressing said lips onto said stem, said spring means being fitted axially between said lips and closer to said top lip.

4. A seal as claimed in claim 1, wherein said first portion is a cylindrical sleeve and fits onto a cylindrical portion (4) of said element supporting said stem, and wherein said first portion is encircled by an integral outer metal sleeve (8) having an annular flange (11) joined to a peripheral annular appendix (12) of a portion (6) connecting said first and second portions of said seal.

5. A seal as claimed in claim 1, wherein said first and second portions are formed from elastomeric material.

6. A seal as claimed in claim 4, wherein said first, second and third portions are formed from elastomeric material.

* * * * *